United States Patent [19]

Chen et al.

[11] Patent Number: 5,426,521
[45] Date of Patent: Jun. 20, 1995

[54] ABERRATION CORRECTION METHOD AND ABERRATION CORRECTION APPARATUS

[75] Inventors: Jun Chen; Guanming Lai, both of Kawagoe; Kazuo Ishizuka, Higashi-Matsuyama; Akira Tonomura, 2-19-5, Kaedegaoka, Hatoyama-machi, Hiki-gun, Saitama 350-03, all of Japan

[73] Assignees: Research Development Corporation of Japan, Tokyo; Akira Tonomura, Saitama, both of Japan

[21] Appl. No.: 995,507

[22] Filed: Dec. 22, 1992

[30] Foreign Application Priority Data

Dec. 24, 1991 [JP] Japan .................................. 3-340782

[51] Int. Cl.[6] .................... G03H 1/08; G03H 1/16; G03H 1/22; G02B 27/46
[52] U.S. Cl. .......................................... 359/9; 359/29; 359/32; 359/559
[58] Field of Search ............... 359/9, 21, 29, 32, 558, 359/559, 560, 561, 564, 16

[56] References Cited

U.S. PATENT DOCUMENTS

| | | | |
|---|---|---|---|
| 3,700,902 | 10/1972 | Buchan | 395/559 |
| 3,744,879 | 7/1973 | Beard et al. | 350/162 SF |
| 3,861,784 | 1/1975 | Torok | 359/573 |
| 4,647,154 | 3/1987 | Birnbach et al. | 359/559 |
| 4,949,389 | 8/1990 | Allebach et al. | 359/559 |
| 5,090,795 | 2/1992 | O'Meara et al. | 359/240 |
| 5,119,214 | 6/1992 | Nishii et al. | 359/9 |
| 5,142,413 | 8/1992 | Kelly | 359/559 |
| 5,155,606 | 10/1992 | Landesman | 359/559 |
| 5,210,625 | 5/1993 | Moss, et al. | 359/9 |

OTHER PUBLICATIONS

Stroke, et al., "Attainment of Diffraction-Limited Imaging in High-Resolution Electron Microscopy by 'A Posteriori' Holographic Image Sharpening, I", *Optik,* vol. 35, No. 1, pp. 50–65, 1972.

Tonomura et al, "Spherical-Aberration Correction of an Electron Lens by Holography," *Japanese Journal of Applied Physics,* vol. 18, No. 7, Jul. 1979, pp. 1373 to 1377.

*Primary Examiner*—Loha Ben
*Assistant Examiner*—John Juba, Jr.
*Attorney, Agent, or Firm*—Armstrong, Westerman, Hattori, McLeland & Naughton

[57] ABSTRACT

A method of and apparatus for efficiently correcting an aberration of an optical system used to record a hologram at the stage of reconstructing an image of the hologram. At the stage of reconstructing an image of a hologram (3), which contains the record of interference fringes formed by a reference plane wave and an object wave modulated by a sample, by applying a plane wave for reconstruction to the hologram (3) from a laser (1), an aberration of an optical system used to record the hologram (3) is canceled by the phase distribution on a liquid crystal panel (6) having a spatial phase modulation function, which is disposed on the Fourier transform plane, thereby correcting the aberration. The phase distribution on the liquid crystal panel (6) can be changed flexibly by a computer (9) in accordance with the aberration coefficients or degree of defocusing of the recording optical system.

9 Claims, 5 Drawing Sheets

ABERRATION CORRECTION METHOD AND ABERRATION CORRECTION APPARATUS

BACKGROUND OF THE INVENTION

The present invention relates to an aberration correction method and an aberration correction apparatus. More particularly, the present invention relates to a method of and apparatus for correcting aberrations of an optical system for recording a hologram at the stage of reconstructing it. More specifically, the present invention relates to a method of and apparatus for flexibly correcting the spherical aberration, defocusing, etc. of an electron lens, for example, at the stage of reconstructing an image of an electron beam hologram, thereby improving the resolution of the electron microscope including the electron lens. Further, the present invention relates to recovery of an out-of-focus photograph and an electron microscope image affected by aberrations of an electron lens.

Electron beam holography, devised to correct aberrations of an electron lens and to thereby improve the resolution of an electron microscope, comprises two processes, that is, photographic recording of an electron beam hologram, which is effected by using an electron beam, and reconstruction of an electron beam hologram, which is performed by using a laser beam. FIG. 5 shows schematically an electron optical system for photographically recording an electron beam hologram. With a sample 72 disposed at one side of an optical axis, a plane electron wave 71 of high coherence is made incident along the optical axis. The electron wave 71 splits into two components, that is, an object wave that is transmitted and modulated by the sample 72, and a reference wave that does not pass through the sample 72, which are once condensed through an objective electron lens 73 to form an image on an intermediate image plane 75. In this system, an electron biprism 74 is disposed in between the objective lens 73 and the imagery plane 75 to bend the object wave traveling at one side of the central filament of the electron biprism 74 and the reference wave traveling at the other side so that these two waves intersect the optical axis and are superposed one upon the other on the imagery plane 75, thereby forming interference fringes. The interference fringes are enlarged through an electron lens 76 and recorded on a photographic film 77, thereby producing a hologram 77.

The hologram produced in this way contains the record of the amplitude and phase of the object wave spatially enlarged by the electron lens as the contrast and displacement, respectively, of the interference fringes. Unlike optical lenses, electron lenses are all convex lenses, in general. Therefore, with electron lenses, aberrations cannot be canceled by combining together convex and concave lenses. Accordingly, an image that is enlarged by an electron lens is affected by the aberrations of the lens, so that the contrast of the image does not exactly reflect the distribution of the sample. In addition, the resolution is limited to a substantial degree.

However, if an interference pattern, which is produced by superposing the object and reference waves so as to interfere with each other, as described above, is recorded, the object wave affected by the aberrations appears as a wavefront of light at the stage of reconstruction of an image, and it is therefore possible to correct the aberrations.

As one of such methods of correcting aberrations, there has been a method wherein an aberration of an electron lens is corrected by using an aberration of an optical concave lens (A. Tonomura, T. Matsuda and J. Endo, "Spherical Aberration Correction of an Electron lens by Holography", Jpn. J. Appl. Phys. 18 (1979) 1373). In this case, when a parallel beam of light from a laser is applied to an electron beam hologram, the incident light is diffracted by the interference fringes of the hologram, so that the reconstructed wave of the object wave and the conjugate wave appear as two rays of diffracted light generated at both sides of the transmitted wave. Aberration correction may be made either by correcting the reconstructed wave, affected by an aberration of an electron convex lens, by using an optical concave lens, or by correcting the conjugate wave, given an aberration of the opposite sign, by using an optical convex lens.

The aberration correction method employing an optical lens enables aberration correction of high accuracy in theory, but it suffers from the following problems in practical application:

(1) It takes a great deal of time to design and produce an optical lens used for aberration correction.

(2) Since parameters of a lens once produced cannot be changed, the prior art is inferior in terms of applicability. In particular, in the case of an electron beam hologram, the aberration function which is to be corrected varies according to experimental conditions, for example, focusing. Therefore, it is desirable that parameters of an optical element for correction should be flexibly changeable in accordance with experimental conditions. It is desirable, depending on the situation, to make active correction by evaluating the corrected image and feeding back the results of the evaluation.

(3) It is difficult to generate a desired unsymmetrical aberration, e.g., astigmatism, by using an optical lens.

In the meantime, correction of an out-of focus photograph or an electron microscope image affected by the aberrations of an electron lens has heretofore been made by applying a parallel beam of light to such an out-of-focus photograph while effecting filtering on the Fourier transform plane by using an inverse filter, which is proportional to the reciprocal of the optical transfer function of the optical system. However, since this inverse filter is generally a complex amplitude filter, the production thereof is difficult. In a prior art, such an inverse filter is realized by laying a real-number filter and a holographic filter one on top of the other (G. W. Stroke and M. Halioua, "Image Improvement in High-Resolution Electron Microscopy with Coherent Illumination (Low-Contrast Objects) Using Holographic Image-Deblurring Deconvolution I", Optik 35 (1972) 50).

However, this method involves the following problems:

(1) It takes a great deal of labor and time to produce a holographic filter.

(2) Since the correction function coded in the holographic filter cannot be changed, the method is inferior in applicability.

(3) Since a hologram is used for the filter, the corrected image is obtained in the form of diffracted light from the hologram. Therefore, the efficiency of utilization of light lowers.

SUMMARY OF THE INVENTION

In view of the above-described circumstances, it is an object of the present invention to provide a method of and apparatus for making aberration correction by using a spatial phase filter at the stage of optically reconstructing a hologram, for example, an electron beam hologram, which contains the record of an object wave affected by an aberration of an electron lens.

It is another object of the present invention to provide a method of and apparatus for correcting an out-of-focus photograph or an electron microscope image by using two filters, that is, an amplitude filter, and a phase filter.

To attain the above-described objects, the present invention provides an aberration correction method in which an aberration of a wavefront is canceled by a phase distribution carried by an optical element for correction, thereby correcting the aberration. In the method, the aberration is corrected by using as the optical element for correction a phase filter for the required correction, which is formed by using an electrooptic element panel having a spatial phase modulation function. The present invention also provides an aberration correction apparatus for carrying out the above-described method, which includes an optical system for Fourier transforming an incident wavefront, and an electrooptic element panel having a spatial phase modulation function, which is disposed on a Fourier transform plane of the incident wavefront. The apparatus further includes means for controlling a phase distribution on the electrooptic element panel.

In addition, the present invention provides an aberration correction method in which at a stage of reconstructing a hologram, which contains the record of interference fringes formed by a reference plane wave and an object wave modulated by a sample, by making a plane wave for reconstruction incident on the hologram, an aberration of an optical system used to record the hologram is canceled by a phase distribution carried by an optical element for correction, thereby correcting the aberration. In the method, the aberration is corrected by using as the optical element for correction a phase filter for the required correction, which is formed by using an electrooptic element panel having a spatial phase modulation function. The present invention also provides an aberration correction apparatus for carrying out the above-described method, which includes a light source for applying the plane wave to the hologram, and an electrooptic element panel having a spatial phase modulation function. The apparatus further includes means for controlling the phase distribution on the electrooptic element panel, and an optical system for selecting only first-order diffracted light from the hologram at the Fourier transform plane of the hologram and applying the first-order diffracted light to the electrooptic element panel.

In addition, the present invention provides an aberration correction method in which a plane wave is made incident on a photographic film which is out of focus or affected by an aberration of a taking optical system, and an image of the photographic film is corrected by an inverse filter disposed on the Fourier transform plane of the plane wave. In the method, the defocusing or aberration is corrected by using as the inverse filter a complex amplitude filter for the required correction, which is formed by using two electrooptic element panels, that is, a first electrooptic element panel which functions as a spatial amplitude filter, and a second electrooptic element panel which functions as a spatial phase filter. The present invention also provides an aberration correction apparatus for carrying out the above-described method, which includes a light source for applying the plane wave to the photographic film, and spatial complex amplitude modulation means including two electrooptic element panels, that is, a first electrooptic element panel which functions as a spatial amplitude filter, and a second electrooptic element panel which functions as a spatial phase filter. The apparatus further includes amplitude and phase distribution control means for controlling a transmittance distribution or a phase distribution on each of the electrooptic element panels.

In any of the above-described methods and apparatus, the electrooptic element panel or the second electrooptic element panel is preferably a liquid crystal panel in which each pixel comprises a sandwich cell of a nematic liquid crystal of homogeneous alignment.

According to the above-described aberration correction method and apparatus of the present invention, an electrooptic element panel is used as a spatial phase filter for aberration correction at the stage of reconstructing an image of a hologram or forming an image of a photographic film, for example. Accordingly, a desired phase distribution can be made at high speed and with ease by a computer-controlled process, and parameters of the filter for correction can be changed instantaneously in accordance with photographing conditions for the hologram or the photographic film. Thus, the method and apparatus of the present invention have wide applicability and high flexibility. It is also possible to cope with an unsymmetrical aberration. Further, it is possible to make aberration correction actively by inputting corrected image data to a computer, and repeatedly making correction with correction parameters changed little by little until the corrected image reaches the desired level of quality.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The principles and embodiments of the aberration correction method and apparatus according to the present invention will be described below with reference to the accompanying drawings.

Figure 1:
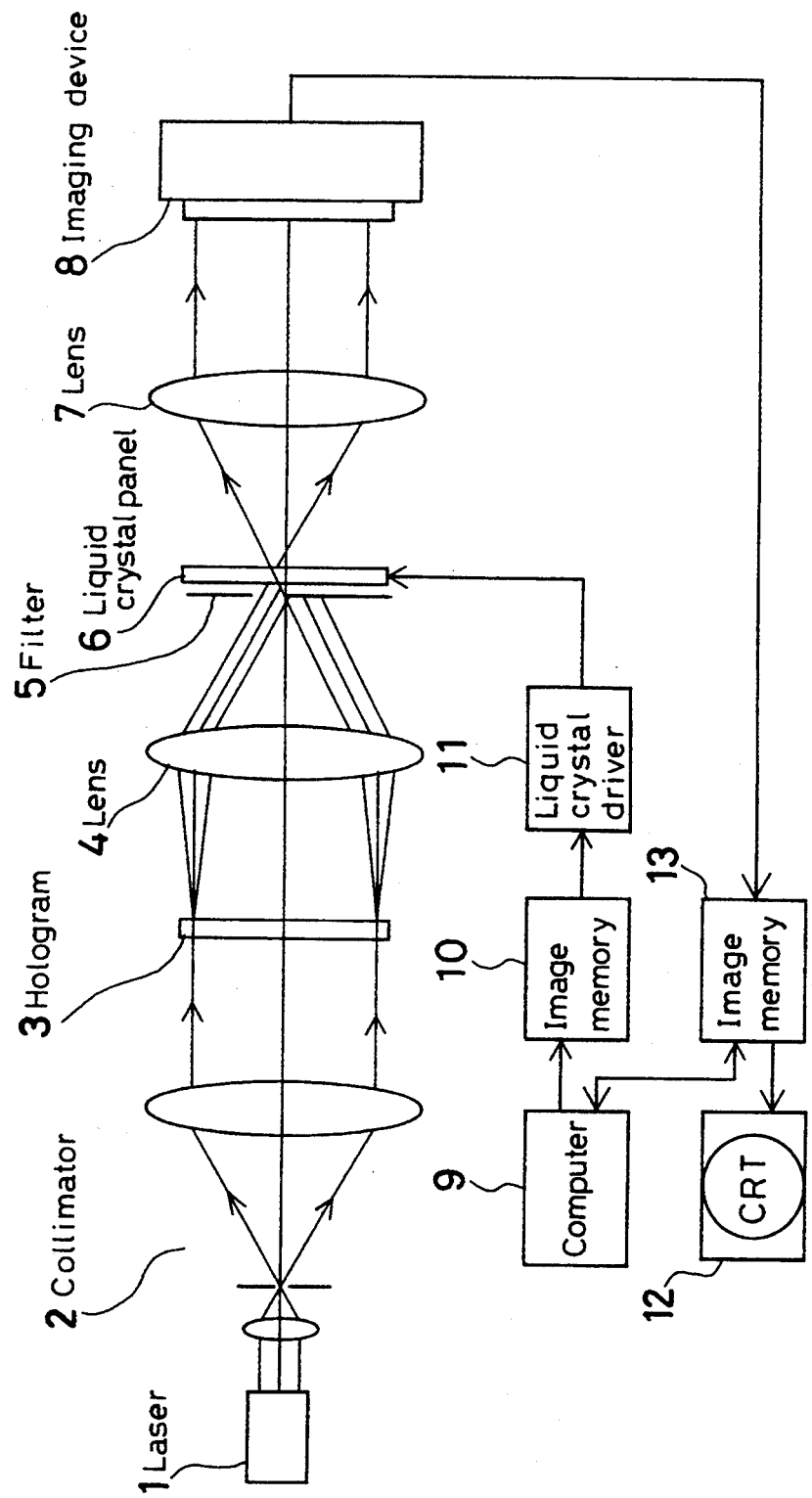
FIG. 1 is a block diagram showing the principle of the aberration correction method according to the present invention.

First, the principle of the method of correcting an aberration at the stage of reconstructing a hologram will be explained with reference to FIG. 1. In FIG. 1, a laser light source 1 emits light of stabilized frequency and intensity. A collimator 2, which comprises an objective lens, a spatial filter, and a collimator lens, converts light from the laser 1 into parallel rays of uniform wavefront. A hologram 3 contains the record of interference fringes produced by interference between a reference wave and an object wave modulated by a sample. The hologram 3 is used to correct an aberration given at the stage of photographic recording thereof. The hologram 3 is disposed on the front focal plane of a Fourier transform lens 4. The Fourier transform lens 4 focuses diffracted light from the hologram 3 on the back focal plane thereof, thereby giving a Fourier transform (spectrum) of the hologram 3. A spatial filter 5 is provided on the back focal plane of the lens 4 to transmit only first-order diffracted light corresponding to the reconstructed wave of the object wave. A liquid crystal panel 6 is arranged such that the phase of each pixel thereof is controlled in response to a signal from a computer 9. When aberration correction is to be made, a phase distribution function, which has a sign opposite to that of an aberration included in the reconstructed wavefront, is generated in the computer 9 and output to the liquid crystal panel 6 to display it. A Fourier transform lens 7 forms an image of the object wave, corrected through the liquid crystal panel 6, on an imaging device 8. The imaging device 8 converts the corrected image into a video signal. The computer 9 for control generates an aberration correction function in accordance with photographing conditions and controls the liquid crystal panel 6 with the aberration correction function. An image memory 10 performs digital-to-analog conversion of the aberration correction data prepared in the computer 9 to form a video signal and outputs it. A driver 11 drives the transmissive liquid crystal panel 6 in accordance with pixel driving signals sequentially sent thereto from the image memory 10. A CRT display device 12 displays an image signal from an image memory 13. The image memory 13 samples the video signal from the imaging device 8 and converts it into a digital signal.

In the theoretical arrangement of the aberration correction apparatus according to the present invention, shown in FIG. 1, parameters such as aberration coefficients are input to the computer 9 in accordance with photographing conditions of the taking optical system (or electron optical system) used to record the hologram 3 to generate an aberration correction function having a sign opposite to that of the pupil function of the taking optical system. The aberration correction function is output through the image memory 10 and the liquid crystal driver 11 to the liquid crystal panel 6, which is disposed on the Fourier transform plane of the reconstructed wave from the hologram 3, thereby giving a phase distribution that is conjugate with the aberration wavefront included in the reconstructed wave from the hologram 3, and thus making aberration correction. Accordingly, it is possible to make a filter for aberration correction at high speed and hence solve the problem of the prior art that a great deal of time has been required for production of a lens for correction.

Figure 2A:
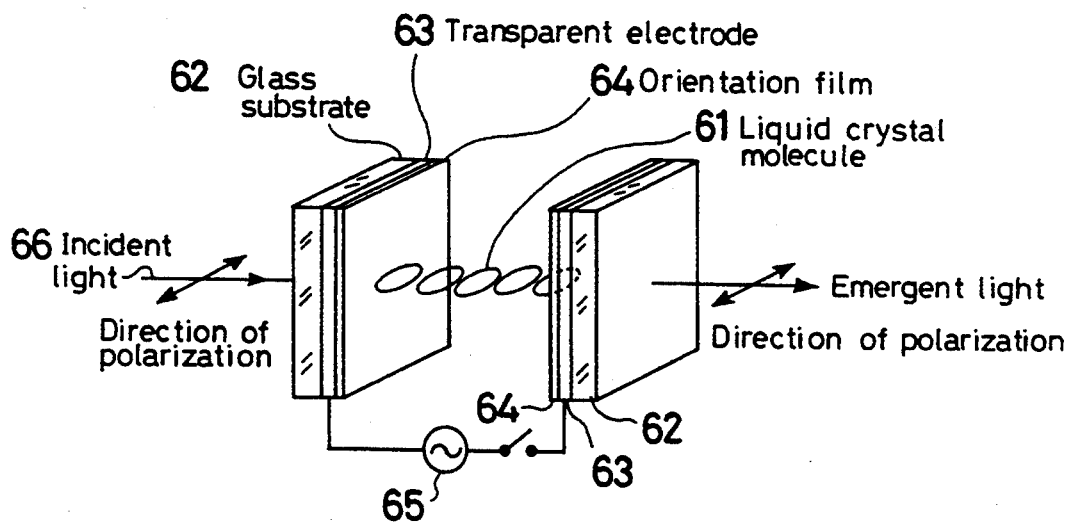
FIGS. 2(a) and 2(b) show a sandwich cell structure according to the invention in a deenergized condition and an energized condition, respectively.
Figure 2B:
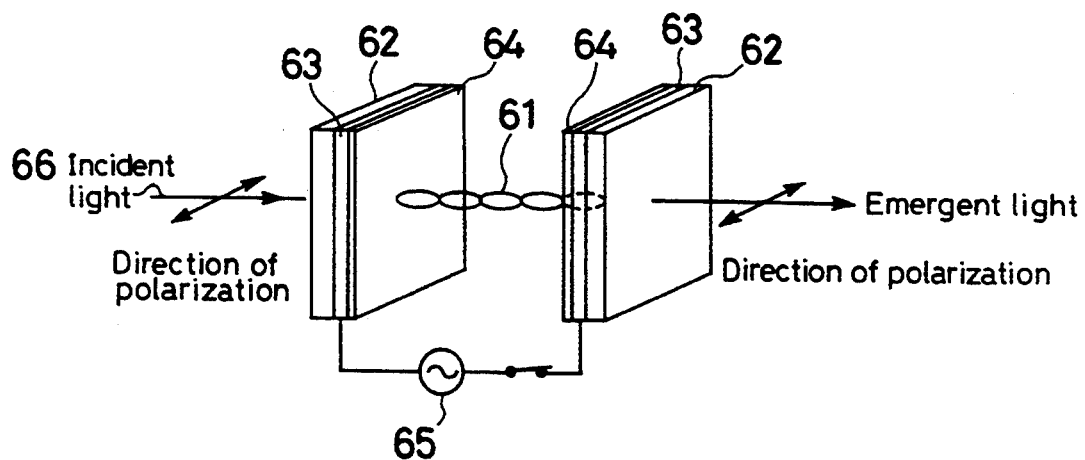

Incidentally, each pixel of the liquid crystal panel 6 can be produced by homogeneously aligning a nematic liquid crystal, for example, (that is, aligning the liquid crystal molecules so that the major axes thereof are parallel to the glass substrates). This will be explained with reference to FIG. 2, which shows a sandwich cell structure. The liquid crystal is sealed in the space between two glass substrates 62 coated with respective transparent electrodes 63. The liquid crystal molecules 61 are lined up in parallel to the glass substrates 62 by orientation films 64. The nematic liquid crystal has refractive index anisotropy (birefringence) which is similar to that of a uniaxial optical crystal, which has an optical axis in the direction of the major axes of the liquid crystal molecules. In other words, the refractive index $n_e$ for light (extraordinary ray), which vibrates parallel to the direction of the major axes of the liquid crystal molecules, and the refractive index $n_o$ for light (ordinary ray), which vibrates perpendicularly to the direction of the major axes of the liquid crystal molecules have different values. Therefore, if the direction of the major axes of the liquid crystal molecules 61 is changed in the plane of vibration of the incident light 66 by application of a voltage 65, the effective refractive index of the liquid crystal can be changed. Accordingly, the optical path length of the incident light 66, that is, phase, can be changed. In FIG. 2, the incident light 66 is applied so that the direction of polarization is parallel to the direction of the major axes of the liquid crystal molecules 61. FIG. 2($a$) shows the condition of the liquid crystal molecules 61 in which the voltage 65 is not applied. The refractive index of the liquid crystal at this time takes the value $n_e$, which is the refractive index for extraordinary rays. On the other hand, if a voltage 65 which exceeds the threshold value is applied, the liquid crystal molecules 61 are reoriented successively from those in the center of the liquid crystal layer so that the major axes of the molecules 61 extend along the electric field, as shown in FIG. 2($b$). The refractive index at this time takes the value $n_o$, which is the refractive index for ordinary rays. If the value of the applied voltage 65 is changed, the number of liquid crystal molecules 61 whose axes rotate changes. Accordingly, it is possible to change the value of the effective refractive index continuously.

Thus, the phase of each pixel of the liquid crystal panel 6 can be readily changed by application of a voltage by virtue of the birefringence of the liquid crystal molecules. Therefore, phase correction parameters can be changed instantaneously. Thus, the applicability of the system improves. It is also possible to arrange an active system by making use of the flexibility of the liquid crystal panel 6. That is, corrected image data, which is taken by the imaging device 8, is input through the image memory 13 to the computer 9 where the corrected image is evaluated by a predetermined evaluation function for, e.g., contrast, and correction is repeatedly made, with the correction parameters changed little by little, until the corrected image satisfies the evaluation function.

Further, since the aberration correction function is generated in the computer 9, it is possible to cope readily with an unsymmetrical aberration, e.g., astigmatism.

Figure 3:
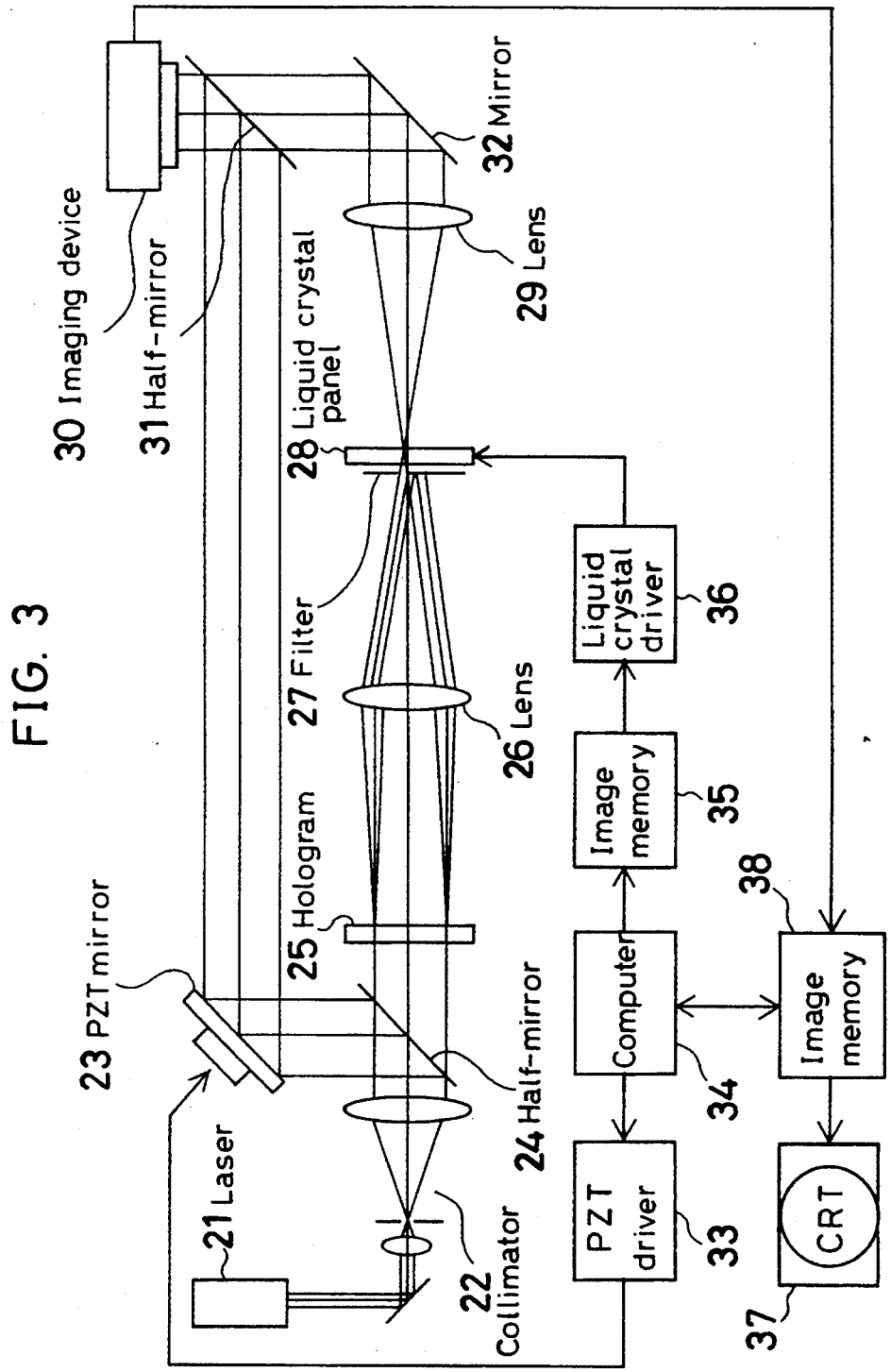
FIG. 3 is an optical path diagram showing one embodiment of the aberration correction apparatus according to the present invention.

Embodiments of the aberration correction method and apparatus according to the present invention will be explained below specifically. FIG. 3 shows the arrangement of one embodiment of the present invention, in which a phase measuring function is added to the theoretical arrangement as shown in FIG. 1. The most important point of this apparatus resides in that a liquid crystal panel 28 is used as an optical element for aberration correction, and phase distribution data necessary for aberration correction is generated in a computer 34, thereby controlling the phase of each pixel of the liquid crystal panel 28 so as to make aberration correction. Referring to FIG. 3, a laser 21 emits light of stabilized frequency and intensity. The light from the laser 21 is formed into a plane wave of uniform wavefront through a collimator 22, which comprises an objective lens, a spatial filter, and a collimator lens, and is then incident on a half-mirror 24. Part of the plane wave incident on the half-mirror 24 is reflected to become a reference wave used for phase measurement. The reference plane wave is reflected by a PZT mirror (i.e., a reflecting mirror attached to a piezoelectric transducer) 23. The remaining part of the incident plane wave passes through the half-mirror 24 and illuminates a hologram 25 as an object of aberration correction. Since the hologram 25 is disposed on the front focal plane of a lens 26, light transmitted through the hologram 25 and light diffracted thereby are focused once on the back focal plane of the lens 26 by the action of the lens 26. A spatial filter 27 is disposed on the back focal plane of the lens 26 to pass only the reconstructed wavefront as it is. A liquid crystal panel 28, such as the liquid crystal panel the action of each pixel of which has been shown in FIG. 2, is disposed just behind the spatial filter 27. A computer 34 generates a correction function having a sign opposite to that of an aberration to be corrected, and outputs it to the liquid crystal panel 28 through an image memory 35 and a liquid crystal driver 36, thereby changing the phase of the pixels of the liquid crystal panel 28 in accordance with the respective control signals. Thus, the liquid crystal panel 27 functions as a desired phase filter for aberration correction. The object wave, the aberration of which has been corrected through the liquid crystal panel 28, is passed through a lens 29, which is disposed at a distance equal to the focal length thereof from the liquid crystal panel 28, to form an image on an imaging device 30 via a mirror 32 and a half-mirror 31. At this time, the plane wave reflected from the PZT mirror 23 is superposed on the object wave by the half-mirror 31 to form interference fringes. Interference fringe information that is detected by the imaging device 30 is stored in an image memory 38 and subjected to an interference fringe analysis in the computer 34 to obtain the distribution of the corrected recorded wavefront. In this embodiment, a phase modulation interference method is used in order to obtain accurately the phase distribution of the recorded wavefront (for example, see Toyohiko Yatagai "Applied Optics: Introduction to Optical Measurement", Maruzen Co., Ltd., pp.131-135, Aug. 30, 1988). For this purpose, the PZT mirror 23 is slightly moved back and forth in response to a signal from a PZT driver 33 so that the phase difference between the two interfering wavefronts changes among 0, $\pi/2$, $\pi$, and $3\pi/2$. The phase distribution of the reconstructed wavefront is obtained accurately from the interference fringe intensity distribution corresponding to each phase difference. The phase distribution thus obtained is output so as to be displayed on an image display device 37.

In the above-described aberration correction apparatus, the liquid crystal panel 28, which is controlled by the computer 34, is used as a filter for aberration correction, and the phase of each pixel of the liquid crystal panel 28 can be readily changed by a driving voltage corresponding to a control signal from the computer 34. Accordingly, the phase filter for correction can be made extremely easily in a short time in comparison to the prior art that employs an optical lens.

In the case of the conventional lens for aberration correction, once a lens is made, the aberration coefficients or the like of the lens cannot be changed, and it is difficult to endow it with the desired unsymmetrical aberration. Therefore, the application range of the lens is limited. In contrast, the use of the liquid crystal panel 28 as in the present invention makes it possible to change flexibly the phase distribution on the filter, which is determined by the aberration coefficients or the degree of defocusing. Accordingly, the phase filter for correction according to the present invention provides wide applicability.

Although the foregoing embodiment premises aberration correction at the stage of reconstructing an image of a hologram, the spatial phase modulation effect that is produced by a liquid crystal panel, as described above, is also useful for correction of an image.

Figure 4:
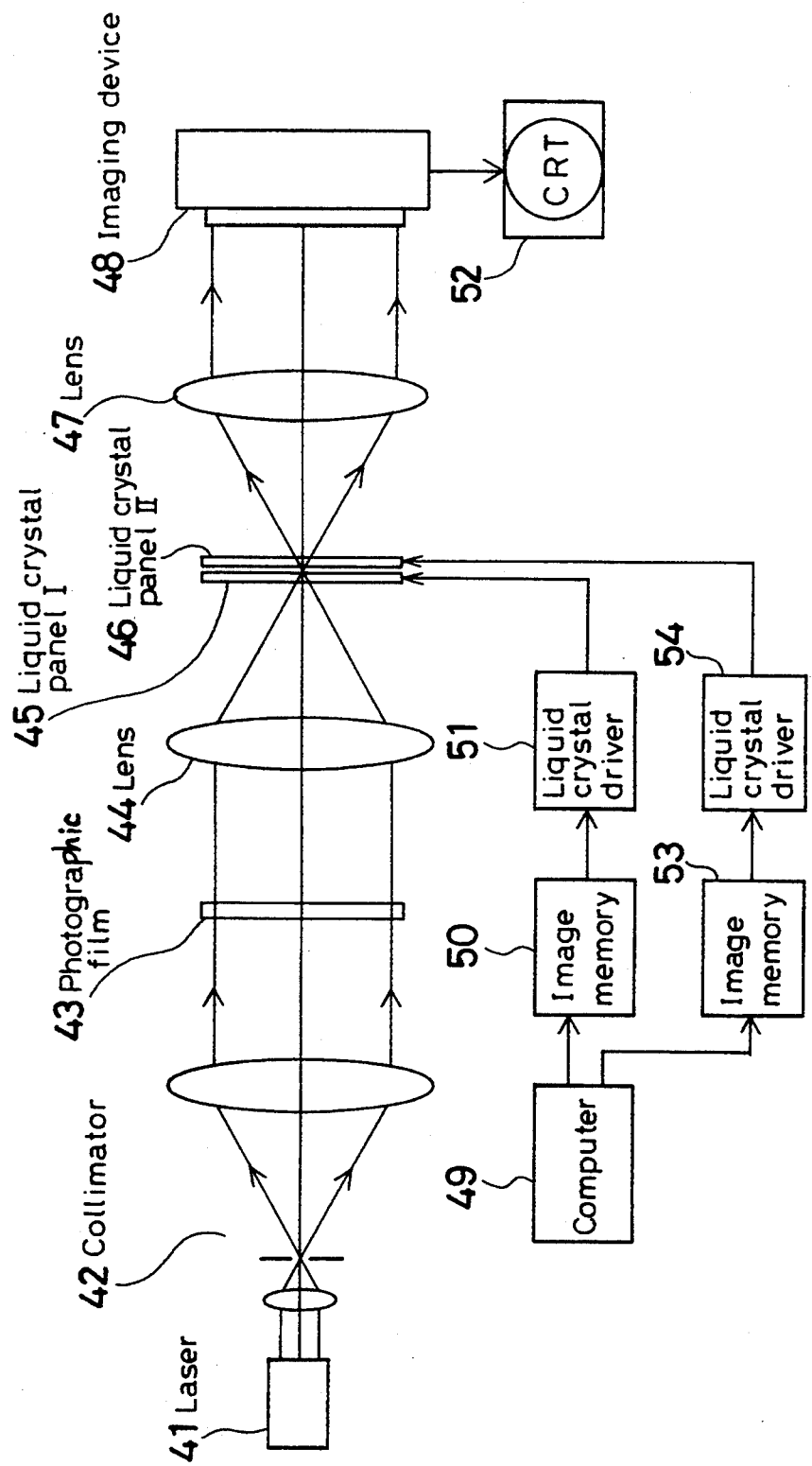
FIG. 4 is an optical path diagram showing one embodiment of the photographic image recovering apparatus according to the present invention.
Figure 5:
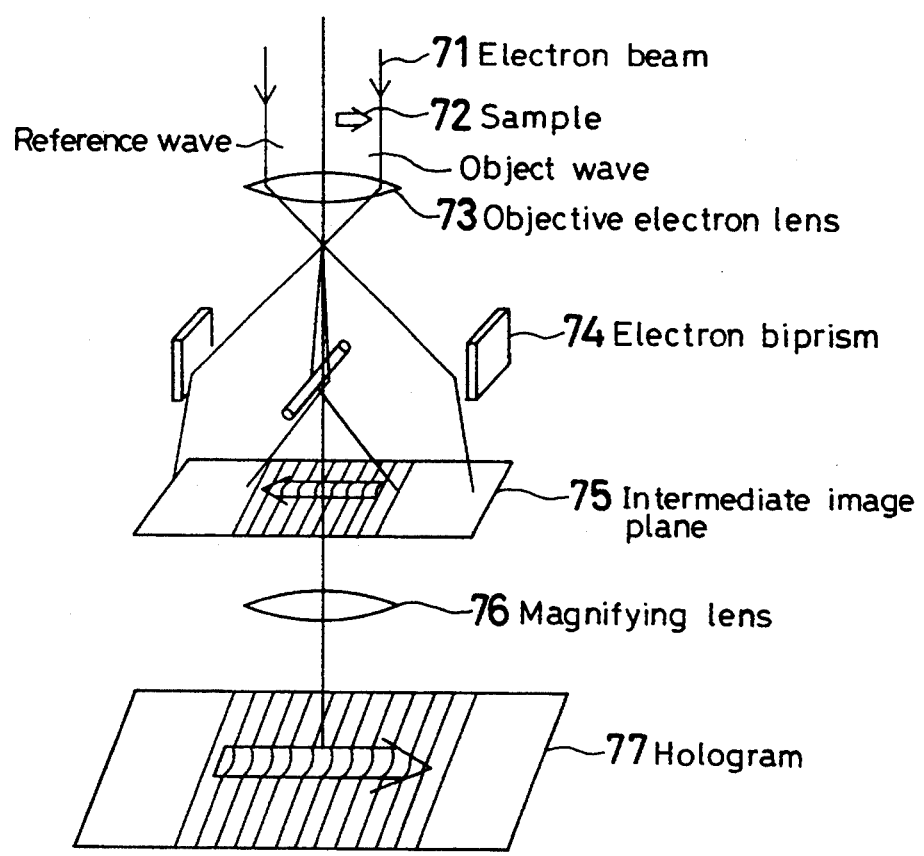
FIG. 5 shows schematically a system for photographically recording an electron beam hologram.

FIG. 4 is an optical path diagram showing an embodiment of an apparatus for recovering an out-of-focus photograph or an electron microscope image. The most important point of this apparatus resides in that an inverse filter is realized as a complex amplitude filter by using two liquid crystal panels 45 and 46 which have a spatial light amplitude modulation function and a spatial light phase modulation function, respectively. Referring to FIG. 4, light from a laser 41 is formed into a plane wave of uniform wavefront through a collimator 42, which comprises an objective lens, a spatial filter, and a collimator lens, to illuminate a photographic film 43 as an object of correction, which is disposed on the front focal plane of a lens 44. Light (transmitted light and diffracted light) emerging from the photographic film 43 is focused on the back focal plane of the lens 44 to obtain a Fourier transform (spectrum) of the photographic film 43. A liquid crystal panel I 45 and a liquid crystal panel II 46 are disposed on the Fourier transform plane. As the liquid crystal panel I 45, a light amplitude modulation element is used which comprises, for example, a twisted nematic liquid crystal in which the molecular alignment is twisted nearly 90°, and two polarizing plates attached to both sides, respectively, of the twisted nematic liquid crystal. As the liquid crystal panel II 46, a spatial phase modulation element liquid crystal panel is used which has a homogeneous alignment and which uses no polarizing plate, as explained with reference to FIG. 2. A computer 49 generates real-number filter data corresponding to the reciprocal of the amplitude of the optical transfer function of the taking optical system used to record the photographic film 43, and delivers it to the liquid crystal panel I 45 through an image memory 50 and a liquid crystal driver 51 to control the transmittance of the liquid crystal panel I 45. At the same time, the computer 49 generates phase filter data in accordance with a function conjugate with the phase of the optical transfer function of the taking optical system used to record the photograph 43 (i.e., a phase distribution having the opposite sign), and delivers it to the liquid crystal panel II 46 through an image memory 53 and a liquid crystal driver 54 to control the phase distribution on the liquid crystal panel II 46. Light transmitted through such a double filter enters a Fourier transform lens 47 and forms an image on an imaging device 48. The corrected image is displayed on an image display device 52.

With the above-described arrangement for recovering an out-of-focus image or an electron microscope image, the inverse filter as a complex amplitude filter, which has heretofore been difficult to produce, can be readily made by a computer-controlled process. In addition, since the filter parameters can be changed easily, the apparatus provides wide applicability. In this case also, it is possible to arrange an active system in which corrected image data, which is taken by the imaging device 48, is input through an image memory to the computer 49 where the corrected image is evaluated by a predetermined evaluation function for, e.g., contrast, and correction is repeatedly made, with the correction parameters of the liquid crystal panels I 45 and II 46 changed little by little, until the corrected image satisfies the evaluation function, in the same way as in the arrangements shown in FIGS. 1 and 3.

In addition, unlike the conventional holographic filter, the arrangement shown in FIG. 4 allows the corrected image to be obtained not from the first-order diffracted light but from the light transmitted through the filter. Therefore, the efficiency of utilization of light is high. Further, there is a merit that the spatial resolution required for the phase filter to make a certain correction is lower than that required for the conventional holographic filter to make the same correction. In a case where the phase is modulated simultaneously when a voltage for amplitude control is applied to the liquid crystal panel I 45 in the arrangement shown in FIG. 4, this excess phase modulation can be corrected by adjusting the voltage applied to the liquid crystal panel II 46.

Although the aberration correction method and apparatus of the present invention have been described above by way of specific embodiments in which the present invention is applied to aberration correction and defocusing correction of an electron beam hologram and an electron microscope image, it should be noted that the present invention is not necessarily limited to these embodiments and that various changes and modifications may be imparted thereto. In addition, objects of correction are not necessarily limited to electron beam holograms and electron microscope images, but the present invention is applicable to various kinds of hologram and photograph. Further, the electronically controllable spatial phase filter is not necessarily limited to the nematic liquid crystal element of homogeneous alignment, as described with reference to FIG. 2, but it can be realized by using other liquid crystal element. It is also possible to realize such a filter by sandwiching an electrooptical crystal between electrodes which are formed in desired patterns by vacuum deposition. In addition, the electronically controllable spatial amplitude filter is not necessarily limited to the 90°-twisted nematic liquid crystal element, but it can also be realized by using other liquid crystal element, electrooptic element, etc.

As has been described above, according to the aberration correction method and apparatus of the present invention, an electrooptic element panel is used as a spatial phase filter for aberration correction at the stage of reconstructing an image of a hologram or forming an image of a photographic film, for example. Accordingly, a desired phase distribution can be made at high speed and with ease by a computer-controlled process, and parameters of the filter for correction can be changed instantaneously in accordance with photographing conditions for the hologram or the photographic film. Thus, the method and apparatus of the present invention have wide applicability and high flexibility. It is also possible to cope with an unsymmetrical aberration. Further, it is possible to make aberration correction actively by inputting corrected image data to a computer, and repeatedly making correction with correction parameters changed little by little until the corrected image reaches the desired level of quality.

It should be noted that it is practical and preferable to employ as a spatial phase filter for aberration correction a liquid crystal panel in which each pixel comprises a sandwich cell of a nematic liquid crystal of homogeneous alignment.

What we claim is:

1. An aberration correction method in which, at a stage of reconstructing a hologram by making a plane wavefront for reconstruction incident on said hologram, which hologram contains the record of interference fringes formed by a reference plane wavefront and an object wavefront modulated by a sample, an aberration of an optical system used to record said hologram is canceled by a phase distribution carried by an optical element for correction, thereby correcting the aberration, said method comprising: using as said optical element for correction a phase filter for said aberration correction, which is formed by using an electrooptic element panel having a spatial phase modulation function.

2. An aberration correction method according to claim 1, wherein said electrooptic element panel is a liquid crystal panel in which each pixel comprises a sandwich cell of a nematic liquid crystal of homogeneous alignment.

3. An aberration correction apparatus in which, at a stage of reconstructing a hologram by making a plane wavefront for reconstruction incident on said hologram, which hologram contains the record of interference fringes formed by a reference plane wavefront and an object wavefront modulated by a sample, an aberration of an optical system used to record said hologram is canceled by a phase distribution carried by an optical element for correction, thereby correcting the aberration, said apparatus comprising:

a light source for applying the plane wavefront to said hologram;

an electrooptic element panel having a spatial phase modulation function;

means for controlling a phase distribution on said electrooptic element panel; and an optical system for selecting only first-order diffracted light from said hologram at a Fourier transform plane of said hologram and applying said first-order diffracted light to said electrooptic element panel.

4. An aberration correction apparatus according to claim 3, further comprising means for taking a corrected image by an imaging device;

means for inputting data on the corrected image through an image memory to a computer, said computer comprising means for evaluating the corrected image by a predetermined evaluation function and making correction repeatedly, and means for changing the phase distribution on said electrooptic element panel incrementally through said phase distribution control means, until the image satisfies said predetermined evaluation function.

5. An aberration correction apparatus according to claim 3 or 4, wherein said electrooptic element panel is a liquid crystal panel in which each pixel comprises a sandwich cell of a nematic liquid crystal of homogeneous alignment.

6. An aberration correction apparatus according to claim 3, further comprising means for allowing a corrected object wavefront and a reference wavefront to interfere with each other on an imagery plane of the object wavefront;
   means for changing a phase difference between the two wavefronts in a plurality of stages in the range from 0 to $2\pi$, and
   means for obtaining a phase distribution of the corrected object wavefront from an interference fringe intensity distribution corresponding to each phase difference.

7. An aberration correction apparatus according to claim 4, wherein said electrooptic element panel is a liquid crystal panel in which each pixel comprises a sandwich cell of a nematic liquid crystal of homogenous alignment.

8. An aberration correction apparatus having a cancelling means for cancelling an aberration of an object wavefront by a phase distribution carried by an optical element for correction, thereby correcting the aberration, said apparatus comprising:
   an optical system for Fourier transforming an incident object wavefront;
   an electrooptic element panel having a spatial phase modulation function, which is disposed on a Fourier transform plane of the incident object wavefront;
   means for allowing interference between the corrected object wavefront and a reference wavefront on an imagery plane of the object wavefront;
   means for changing a phase difference between the two wavefronts in a plurality of stages in the range from 0 to $2\pi$;
   means for obtaining a phase distribution of the corrected object wavefront from an interference fringe intensity distribution corresponding to each phase difference, and
   further comprising means for taking a corrected image by an imaging device;
   means for inputting data on the corrected image through an image memory to a computer, said computer comprising means for evaluating the corrected image by a predetermined evaluation function and making correction repeatedly, and
   control means for changing the phase distribution on said electrooptic element panel incrementally through said phase distribution control means, until the corrected image satisfies said predetermined evaluation function.

9. An aberration correction apparatus in which an aberration of an object wavefront is canceled by a phase distribution carried by an optical element for correction, thereby correcting the aberration, said apparatus comprising:
   an optical system for Fourier transforming an incident object wavefront; a liquid crystal panel in which each pixel comprises a sandwich cell of a nematic liquid crystal of homogeneous alignment having, said liquid crystal panel having a spatial phase modulation function, which is disposed on a Fourier transform plane of the incident wavefront; and
   means for controlling a phase distribution on said light crystal panel,
   means for allowing interference between the corrected object wavefront and a reference wavefront on an imagery plane of the object wavefront, and means for changing a phase difference between the two wavefronts in a plurality of stages in the range of from 0 to $2\pi$, and means for obtaining a phase distribution of the corrected object wavefront from an interference fringe intensity distribution corresponding to each phase distribution.

* * * * *